United States Patent
Zhu et al.

(10) Patent No.: US 10,379,326 B2
(45) Date of Patent: Aug. 13, 2019

(54) OFF-AXIS ASPHERIC THREE-MIRROR OPTICAL SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Tong-Tong Gong, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 108 days.

(21) Appl. No.: 15/672,306

(22) Filed: Aug. 9, 2017

(65) Prior Publication Data

US 2018/0157016 A1    Jun. 7, 2018

(30) Foreign Application Priority Data

Dec. 5, 2016 (CN) .......................... 2016 1 1107807

(51) Int. Cl.
*G02B 17/06* (2006.01)

(52) U.S. Cl.
CPC ..... *G02B 17/0626* (2013.01); *G02B 17/0642* (2013.01)

(58) Field of Classification Search
CPC ...................... G02B 17/0626; G02B 17/0642
See application file for complete search history.

(56) References Cited

U.S. PATENT DOCUMENTS

| | | | | |
|---|---|---|---|---|
| 9,268,122 | B2* | 2/2016 | Zhu ........................ | G01J 1/0414 |
| 9,405,109 | B2* | 8/2016 | Yang .................. | G02B 17/0642 |
| 9,568,717 | B2* | 2/2017 | Hou ................... | G02B 17/0636 |
| 2015/0253552 | A1* | 9/2015 | Zhu ........................ | G01J 1/0414 |
| | | | | 250/216 |
| 2015/0346022 | A1* | 12/2015 | Yang .................. | G02B 17/0642 |
| | | | | 250/216 |
| 2016/0170190 | A1* | 6/2016 | Hou ................... | G02B 17/0636 |
| | | | | 359/859 |

* cited by examiner

*Primary Examiner* — Jennifer D. Carruth
(74) *Attorney, Agent, or Firm* — ScienBiziP, P.C.

(57) ABSTRACT

An off-axis aspheric three-mirror optical system comprises a primary mirror, a secondary mirror, and a tertiary mirror. Relative to a first three-dimensional rectangular coordinates system in space, a second three-dimensional rectangular coordinates system is defined by a primary mirror location, a third three-dimensional rectangular coordinates system is defined by a secondary mirror location, and a fourth three-dimensional rectangular coordinates system is defined by a tertiary mirror location. The primary mirror in the second three-dimensional rectangular coordinates system, the secondary mirror in the third three-dimensional rectangular coordinates system, and the tertiary mirror in the fourth three-dimensional rectangular coordinates system are all sixth-order polynomial aspheric.

17 Claims, 16 Drawing Sheets

OFF-AXIS ASPHERIC THREE-MIRROR OPTICAL SYSTEM

CROSS-REFERENCE TO RELATED APPLICATIONS

This application claims all benefits accruing under 35 U.S.C. § 119 from China Patent Application No. 201611107807.0, field on Dec. 5, 2016 in the China Intellectual Property Office, disclosure of which is incorporated herein by reference. The application is also related to copending applications entitled, "METHOD FOR MAKING OFF-AXIS ASPHERIC OPTICAL SYSTEM", filed Aug. 9, 2017 Application No. 15/672,307.

FIELD

The present disclosure relates to an off-axis aspheric three-mirror optical system.

BACKGROUND

Compared with spherical and quadric surfaces, aspheric surfaces have more degrees of design freedom. If aspheric surfaces are used in off-axis three-mirror optical systems, the aberrations of the off-axis three-mirror optical systems can be significantly reduced, while the freedom of the off-axis three-mirror optical systems can be greatly improved.

However, conventional off-axis aspheric three-mirror optical system are mainly applied to linear field of view with small field angles and large F-number, but the applications in the field of view with large field angles and small F-number are limited.

BRIEF DESCRIPTION OF THE DRAWINGS

Implementations of the present technology will now be described, by way of example only, with reference to the attached figures.

DETAILED DESCRIPTION

Figure 1:
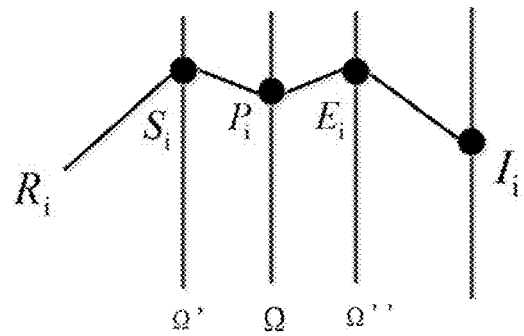
FIG. 1 is a schematic view of start point and end point of one feature ray while solving the feature data points.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A method for designing an off-axis aspheric optical system of one embodiment is provided. The method comprises the following steps:

step (S1), establishing an initial system, wherein the initial system comprises a plurality of initial surfaces, and each of the plurality of initial surfaces corresponds to one aspheric surface of the off-axis aspheric optical system; one aspheric surface of the off-axial aspheric optical system is defined as an aspheric surface "a", another aspheric surface of the off-axial aspheric optical system is defined as an aspheric surface "b"; and selecting a plurality of feature rays $R_i$ ($i=1, 2 \ldots K$) from different fields and different aperture positions;

step (S2), keeping the plurality of initial surfaces unchanged, and solving a plurality of feature data points $(P_1, P_2, \ldots P_m)$ point by point based on given object-image relationship and Snell's law to obtain an initial off-axis aspheric surface $A_m$ by surface fitting the plurality of feature data points $(P_1, P_2, \ldots P_m)$, wherein m is less than K;

step (S3), introducing an intermediate point $G_m$ based on the initial off-axis aspheric $A_m$ to solve a (m+1)th feature data point $P_{m+i}$, and fitting the (m+1) feature data points $(P_1, P_2, \ldots P_m, P_{m+1})$ to obtain an off-axis aspheric surface $A_{m+1}$; introducing an intermediate point $G_{m+1}$ based on the off-axis aspheric surface $A_{m+1}$ to solve a (m+2)th feature data point $P_{m+2}$, and fitting the (m+2) feature data points $(P_1, P_2, \ldots P_m, P_{m+1}, P_{m+2})$ to obtain an off-axis aspheric surface $A_{m+2}$; repeating such steps until a Kth feature data point $P_K$ is solved, and fitting the feature data points $(P_1, P_2, \ldots P_K)$ to obtain an off-axis aspheric surface $A_K$, wherein the off-axis aspheric surface $A_K$ is the aspheric surface "a";

step (S4), keeping the aspheric surface "a" and other initial surfaces except the initial surface corresponds to the aspheric surface "b" unchanged, and solving a plurality of feature data points $(P'_1, P'_2, \ldots P'_m)$ point by point based on given object-image relationship and Snell's law to obtain an initial off-axis aspheric surface $A'_m$ by surface fitting the plurality of feature data points $(P'_1, P'_2, \ldots P'_m)$, wherein m is less than K;

step (S5), introducing an intermediate point $G'_m$ based on the initial off-axis aspheric surface $A_m$ to solve a (m+1)th feature data point $P'_{m+1}$, and fitting the (m+1) feature data points $(P'_1, P'_2, \ldots P'_{m+1})$ to obtain an off-axis aspheric surface $A'_{m+1}$; introducing an intermediate point $G_{m+1}$ based on the off-axis aspheric surface $A'_{m+1}$ to solve a (m+2)th feature data point $P'_{m+2}$, and fitting the (m+2) feature data points $(P'_1, P'_2, \ldots P'_{m+1}, P'_{m+2})$ to obtain an off-axis aspheric surface $A'_{m+2}$; repeating such steps until a Kth feature data point $P'_K$ is solved, and fitting the feature data points $(P'_1, P'_2, \ldots P'_K)$ to obtain an off-axis aspheric surface $A'_K$, wherein the off-axis aspheric $A'_K$ is the aspheric surface "b"; and step (S6), repeating the steps (S2)~(S5) until all the aspheric surfaces of the off-axis aspheric optical system are obtained.

In step (S1), a premise for establishing the initial system is to eliminate obscuration. The initial surface can be a planar surface or a spherical surface. In one embodiment, the initial system comprises three initial surfaces; the three initial surfaces are a primary mirror initial surface, a secondary mirror initial surface and a tertiary mirror initial surface. Each of the primary mirror initial surface, the secondary mirror initial surface and the tertiary mirror initial surface is a planar surface with eccentricity and inclination.

A method for selecting the plurality of feature rays $R_i$ (i=1, 2 . . . K) from different fields and different aperture positions comprises steps of: M fields are selected according to the optical systems actual needs; an aperture of each of the M fields is divided into N equal parts; and, P feature rays at different aperture positions in each of the N equal parts are selected. As such, K=M×N×P different feature rays correspond to different aperture positions and different fields are fixed. The aperture can be circle, rectangle, square, oval or other shapes. In one embodiment, the aperture of each of the M fields is a circle, and a circular aperture of each of the M fields is divided into N angles with equal interval φ, as such, N=2π/φ; then, P different aperture positions are fixed along a radial direction of each of the N angles. Therefore, K=M×N×P different feature rays correspond to different aperture positions and different fields are fixed. In one embodiment, six fields are fixed in the construction process, the six fields are (0°, −16°), (0°, −13°), (0°, −10°), (1°, −16°), (1°, −13°), and (1°, −10°); one hundred and twelve feature rays are fixed from each of the six fields. Therefore, six hundred and seventy-two different feature rays correspond to different aperture positions and different fields are fixed.

Referring to FIG. 1, a surface Ω is defined as an unknown aspheric surface, a surface Ω' is defined as a surface located adjacent to and before the surface Ω, and a surface Ω" is defined as a surface located adjacent to and behind the surface Ω. Defining the intersection points of the plurality of feature rays $R_i$ (i=1, 2 . . . K) with the surface Ω as the feature data points $P_i$ (i=1, 2 . . . K). The feature data points $P_i$ (i=1, 2 . . . K) can be obtained by the intersection points of the feature rays $R_i$ (i=1, 2 . . . K) with the surface Ω' and the surface Ω". The plurality of feature rays $R_i$ (i=1, 2 . . . K) are intersected with the surface Ω' at a plurality of start points $S_i$ (i=1, 2 . . . K), and intersected with the surface Ω" at a plurality of end points $E_i$ (i=1, 2 . . . K). When the surface Ω and the plurality of feature rays $R_i$ (i=1, 2 . . . K) are determined, the plurality of start points $S_i$ (i=1, 2 . . . K) of the feature rays $R_i$ (i=1, 2 . . . K) can also be determined. The plurality of end points $E_i$ (i=1, 2 . . . K) can be obtained based on the object-image relationship. Under ideal conditions, the feature rays $R_i$ (i=1, 2 . . . K) emitted from the plurality of start points $S_i$ (i=1, 2 . . . K) on the surface Ω'; pass through the feature data points $P_i$ (i=1, 2 . . . K) on the surface Ω; intersect with the surface Ω" at the plurality of end points $E_i$ (i=1, 2 . . . K); and finally intersect with the image plane at the plurality of ideal image points $I_i$ (i=1, 2 . . . K). When the surface Ω is a tertiary mirror, a plurality of intersection points of the plurality of feature rays $R_i$ (i=1, 2 . . . K) and a secondary mirror are the plurality of start points $S_i$ (i=1, 2 . . . K), a plurality of intersection points of the plurality of feature rays $R_i$ (i=1, 2 . . . K) and the image plane are the plurality of end points $E_i$ (i=1, 2 . . . K), and the plurality of end points $E_i$ (i=1, 2 . . . K) are the plurality of ideal image points $I_i$ (i=1, 2 . . . K). When the surface Ω is the secondary mirror, a plurality of intersection points of the plurality of feature rays $R_i$ (i=1, 2 . . . K) and a primary mirror are the plurality of start points $S_i$ (i=1, 2 . . . K), the plurality of end points $E_i$ (i=1, 2 . . . K) are the points on the tertiary mirror which minimizes an optical path length between the plurality of feature data points $P_i$ (i=1, 2 . . . K) and the plurality of ideal image points $I_i$ (i=1, 2 . . . K). When the surface Ω is the primary mirror, the plurality of end points $E_i$ (i=1, 2 . . . K) are the points on the secondary mirror which minimizes an optical path length between the plurality of feature data points $P_i$ (i=1, 2 . . . K) and the plurality of ideal image points $I_i$ (i=1, 2 . . . K).

In step (S2), a value of m is selected to improve an accuracy of the aspheric surface fitting. In one embodiment, the value of m can be ranged from about K/3 to about 2K/3. If the value of m is too small, such as less than K/3, a fitting error will be large; on the contrary, if the value of m is too large, such as large than 2K/3, the subsequent feature data points are few, which is not conducive to further reduce the fitting error. In one embodiment, the value of m is about K/2.

The plurality of feature data points $(P_1, P_2, \ldots P_m)$ can be obtained by the following two calculating methods.

A first calculating method includes the following sub-steps:

Step (a): defining a first intersection point of a first feature ray $R_1$ and the initial surface corresponding to the aspheric surface "a" as the feature data point $P_1$;

Step (b): when i (1≤i≤m−1) feature data points $P_i$ (1≤i≤m−1) have been obtained, a unit normal vector $\vec{N}_i$ (1≤i≤m−

1) at each of the i (1≤i≤m−1) first feature data points $P_i$ (1≤i≤m−1) can be calculated based on a vector form of Snell's Law;

Step (c): making a first tangent plane at each of the i (1≤i≤m−1) feature data points $P_i$ (1≤i≤m−1); thus i first tangent planes can be obtained, and i×(m−i) second intersection points can be obtained by the i first tangent planes intersecting with remaining (m−i) feature rays; and a second intersection point, which is nearest to the i (1≤i≤m−1) feature data points $P_i$, is fixed from the i×(m−i) second intersection points as a next feature data point $P_{i+1}$ (1≤i≤m−1); and Step (d): repeating steps b and c, until all the plurality of feature data points $P_i$ (i=1, 2 . . . m) are calculated.

In step (b), the unit normal vector $\vec{N}_i$ (1≤i≤m−1) at each of the feature data point $P_i$ (1≤i≤m−1) can be calculated based on the vector form of Snell's Law. When the surface Ω is a refractive surface, $$\vec{N}_i = \frac{n'\vec{r}_i' - n\vec{r}_i}{|n'\vec{r}_i' - n\vec{r}_i|} \quad (1)$$

$$\vec{r}_i = \frac{\overrightarrow{P_iS_i}}{|\overrightarrow{P_iS_i}|}$$

is a unit vector along a direction of an incident ray of the the surface Ω;

$$\vec{r}_i' = \frac{\overrightarrow{E_iP_i}}{|\overrightarrow{E_iP_i}|}$$

is a unit vector along a direction of an exit ray of the the surface Ω; and n, n' is refractive index of a media at two opposite sides of the surface Ω respectively.

Similarly, when the surface Ω is a reflective surface, $$\vec{N}_i = \frac{\vec{r}_i' - \vec{r}_i}{|\vec{r}_i' - \vec{r}_i|} \quad (2)$$

The unit normal vector $\vec{N}_i$ at the feature data points $P_i$ (i=1, 2 . . . m) is perpendicular to the first tangent plane at the feature data points $P_i$ (i=1, 2 . . . m). Thus, the first tangent planes at the feature data points $P_i$ (i=1, 2 . . . m) can be obtained.

The first calculating method includes a computational complexity formula of $$T(K) = \sum_{i=1}^{K-1} i(K-i) = \frac{1}{6}K^3 - \frac{1}{6}K = O(K^3).$$

When multi-feature rays are used in a design, the first calculating method requires a long computation time.

A second calculating method includes the following substeps:

Step (a'): defining a first intersection point of a first feature ray $R_1$ and the aspheric "a" as the feature data point $P_1$;

Step (b'): when an ith (1≤i≤m−1) feature data point $P_i$ (1≤i≤m−1) has been obtained, a unit normal vector $\vec{N}_i$ at the ith (1≤i≤m−1) feature data point $P_i$ (1≤i≤m−1) can be calculated based on the vector form of Snell's Law;

Step (c'): making a first tangent plane through the ith (1≤i≤m−1) feature data point $P_i$ (1≤i≤m−1); and (m−i) second intersection points can be obtained by the first tangent plane intersects with remaining (m−i) feature rays; a second intersection point $Q_{i+1}$, which is nearest to the ith (1≤i≤m−1) feature data point $P_i$ (1≤i≤m−1), is fixed; and a feature ray corresponding to the second intersection point $Q_{i+1}$ is defined as $R_{i+1}$, a shortest distance between the second intersection point $Q_{i+1}$ and the ith (1≤i≤m−1) feature data point $P_i$ (1≤i≤m−1) is defined as $d_i$;

Step (d'): making a second tangent plane at (i−1) feature data points that are obtained before the ith feature data point $P_i$ (1≤i≤m−1) respectively; thus, (i−1) second tangent planes can be obtained, and (i−1) third intersection points can be obtained by the (i−1) second tangent planes intersecting with a feature ray $R_{i+1}$; in each of the (i−1) second tangent planes, each of the third intersection points and its corresponding feature data point form an intersection pair; the intersection pair, which has the shortest distance between a third intersection point and its corresponding feature data point, is fixed; and the third intersection point and the shortest distance is defined as $Q'_{i+1}$ and $d'_i$ respectively;

Step (e'): comparing $d_i$ and $d'_i$, if $d_i \leq d'_i$, $Q_{i+1}$ is taken as the next feature data point $P_{i+1}$ (1≤i≤m−1); otherwise, $Q'_{i+1}$ is taken as the next feature data point $P_{i+1}$ (1≤i≤m−1); and Step (f'): repeating steps from b' to e', until the plurality of feature data points $P_i$ (i=1, 2 . . . m) are all calculated.

In Step (b'), a calculating method of the unit normal vector $\vec{N}_i$ at the ith (1≤i≤m−1) feature data point $P_i$ (1≤i≤m−1) is same as the first calculation method.

A second calculating method includes a computational complexity formula of $$T(K) = \sum_{i=1}^{K-1} K - i + i - 1 = (K-1)^2 = O(K^2).$$

When multi-feature rays are used in a design, the computational complexity of the second calculating method is smaller than the computational complexity of the first calculating method. In one embodiment, constructing the plurality of first feature data points $P_i$ (i=1, 2 . . . m) point by point using the second calculating method.

Figure 2:
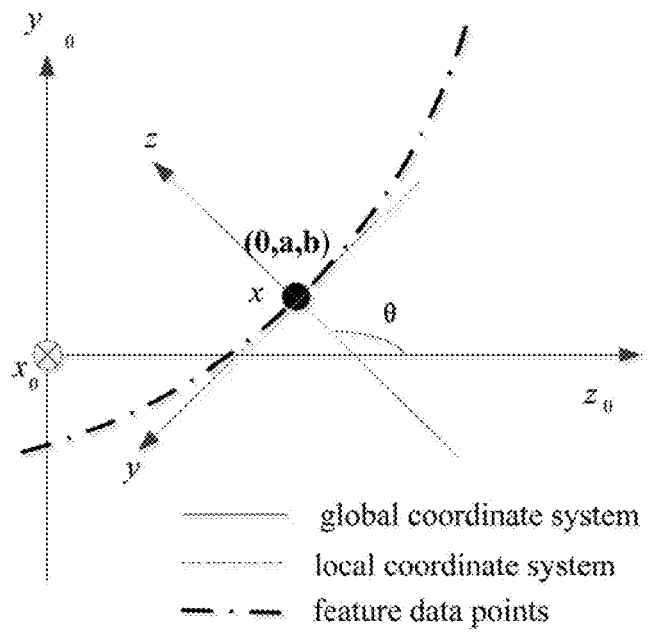
FIG. 2 is a position diagram of one embodiment of a global coordinate system and a local coordinate system.

Referring to FIG. 2, a global coordinate system $x_0y_0z_0$ is defined by a primary mirror location. A beam propagation direction is defined as a $Z_0$-axis. A plane perpendicular to the $Z_0$-axis is defined as an $x_0o_0y_0$ plane. A local coordinate system xyz is defined with an aspheric symmetric center (0, a, b) as an origin and an aspherical symmetry axis as a Z-axis. The local coordinate system xyz can be described by the parameters (a, b, θ), wherein θ is a rotation angle of the local coordinate system xyz relative to the global coordinate system $x_0o_0y_0$.

The plurality of feature data points ($P_1, P_2, \ldots P_m$) are fitted under the local coordinate system xyz to obtain the initial off-axis aspheric surface $A_m$.

Figure 3:
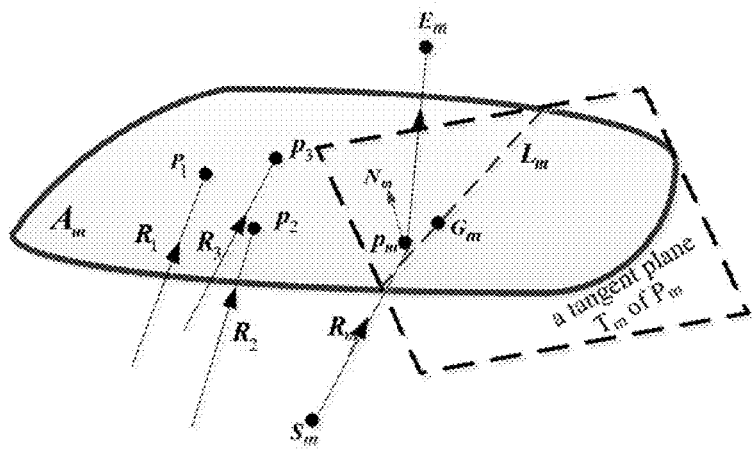
FIG. 3 is a schematic view of one embodiment of solving an intermediate point $G_m$.

In step (S3), referring to FIG. 3, a method for calculating the intermediate point $G_m$ comprises: a tangent plane $T_m$ at the feature data point $P_m$ is solved, the tangent plane $T_m$ intersects with the initial off-axis aspheric surface $A_m$ at an intersection line $L_m$; and in the global coordinate system $x_0y_0z_0$, a feature data point located on the intersection line $L_m$ whose x coordinate is the same as an x coordinate of the feature data point $P_m$ is defined as the intermediate point $G_m$.

The feature data point $P_{m+1}$ is an intersection point between its corresponding feature ray and a tangent plane of the feature data points $(P_1, P_2, \ldots P_m)$ that is closest to the feature data point $P_{m+1}$.

Figure 4:
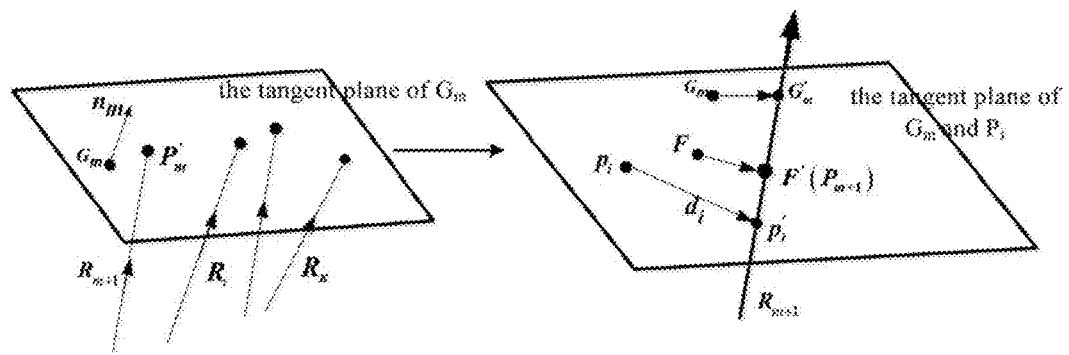
FIG. 4 is a schematic view of one embodiment of solving a feature data point $P_{m+1}$.

Referring to FIG. 4, a method for solving the (m+1)th feature data point $P_{m+1}$ comprises the sub steps: first, finding the feature ray corresponding to the (m+1)th feature data point $P_{m+1}$, wherein the feature ray corresponding to the (m+1)th feature data point $P_{m+1}$ is nearest to the intermediate point $G_m$ in the remaining K-m characteristic rays. Since the intermediate point $G_m$ is located on the initial off-axis aspheric surface $A_m$, a normal vector $n_m$ and a tangent plane of the intermediate point $G_m$ at the initial off-axis aspheric $A_m$ can be obtained according to an aspheric expression. (K−m) intersection points can be obtained by the tangent plane of the intermediate point $G_m$ intersecting with remaining (K−m) feature rays, an intersection point $P'_m$, which is nearest to the intermediate point $G_m$ is fixed from the (K−m) intersection points; the feature ray where the intersection point $P'_m$ is located on is the feature ray $R_{m+1}$ that corresponds to the feature data point $P_{m+1}$. Second, m intersection points $P'_i$ (1≤i≤m) can be obtained by the feature ray $R_{m+1}$ intersects with each of the tangent planes of the feature data points $(P_1, P_2 \ldots P_m)$, and an intersection point $G'_m$ can be obtained by the feature ray $R_{m+1}$ intersects with the intermediate point $G_m$. The feature data points $(P_1, P_2 \ldots P_m)$ and the intermediate point $G_m$ are defined as "F"; the m intersection points $P'_i$ (1≤i≤m) and the intersection point $G'_m$ are defined as "F'". A pair of (F–F') which has shortest distance is found from $(P_1, P_2 \ldots P_m)$–$P'_i$ and $G'_m$–$G_m$. The point F is closest to the feature data point $P_{m+1}$, and the point F' is the next feature data point $P_{m+1}$.

The methods for solving the feature data points $P_{m+2}$ and $P_K$ are the same as the method for solving the feature data point $P_{m+1}$. A method for solving an intermediate point $G_{m+1}$ in a process of solving the feature data point $P_{m+2}$ and a method for solving an intermediate point $G_{K-1}$ in a process of solving the feature data point $P_K$ are the same as the method for solving the intermediate point $G_m$.

Figure 5:
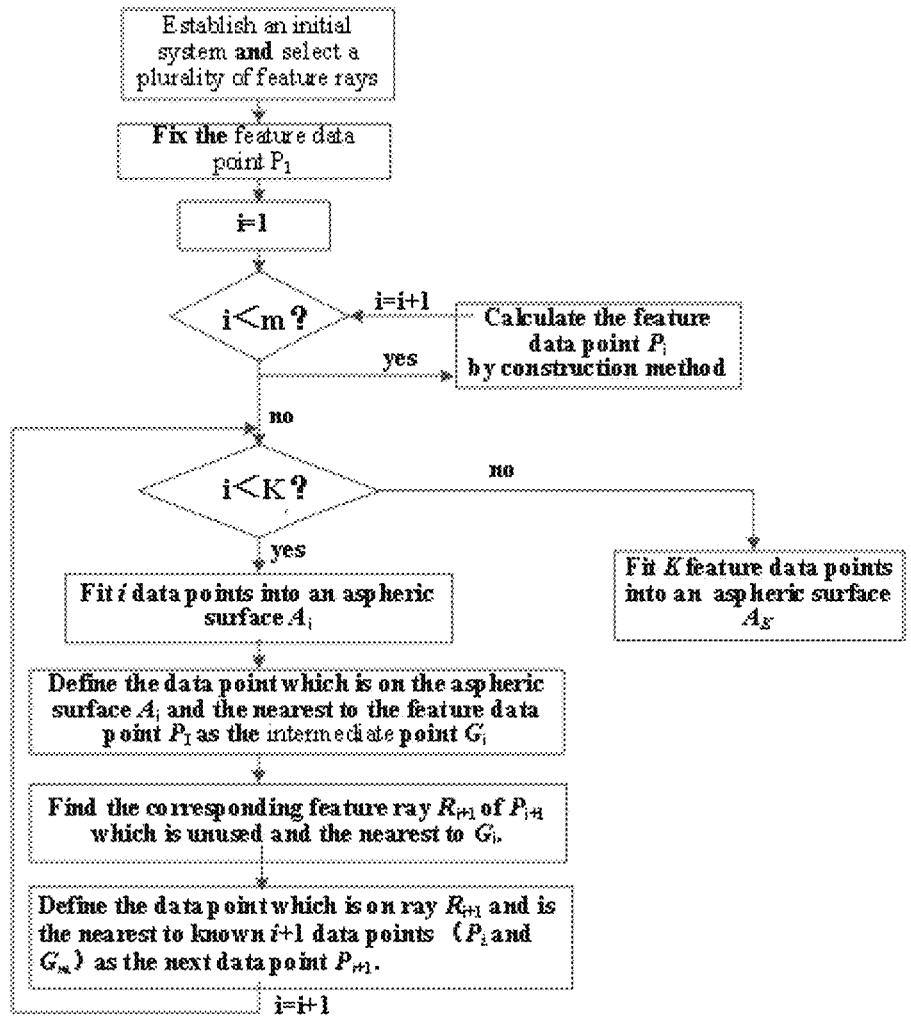
FIG. 5 is a calculation flow chart of one embodiment of solving the feature data points $(P_1, P_2 \ldots P_K)$ on an aspheric surface.

FIG. 5 is a calculation flow chart for solving all the feature data points $(P_1, P_2 \ldots P_K)$ on the aspheric surface.

The feature data points $(P_1, P_2 \ldots P_K)$ are fitted in the global coordinate system $x_0y_0z_0$ to obtain the off-axis aspheric surface $A_K$. An equation of the off-axis aspheric surface $A_K$ can be expressed as follows:

$$Z = \frac{cr^2}{1+\sqrt{1-(1+k)c^2r^2}} + \sum_{i=1}^{p} a_i r^{2(i+1)} \quad r^2 = x^2 + y^2, \quad (1)$$

Wherein $$\frac{cr^2}{1+\sqrt{1-(1+k)c^2r^2}}$$

is a quadratic term, c represents surface curvature at quadratic surface vertex, k represents conic constant, $$\sum_{i=1}^{p} a_i r^{2(i+1)}$$

is an aspheric term, while $a_i$ represents the ith term coefficient.

The equation of the off-axis aspheric surface $A_K$ can be transformed into linear XY polynomials by a Taylor series expansion to simplify the fitting process. Thus, the equation of the off-axis aspheric surface $A_K$ also be expressed as follows:

$$Z = Ar^2 + Br^4 + Cr^6 + Dr^8 + \ldots \quad r^2 = x^2 + y^2 \quad (2)$$
$$A = \frac{1}{2}c, \, B = a_1 + \frac{1}{8}(k+1)c^3, \, C = a_2 + \frac{1}{16}(k+1)^2c^5,$$
$$D = a_3 + \frac{5}{128}(k+1)^3c^7.$$

Wherein, L is a more than eighth order term about r. Since an order of L term is too high, a processing of the off-axis aspheric surface $A_K$ is more difficult, so the L item can be directly omitted in the actual calculation.

A fitting normal vector N=(U, V, −1) of the feature data points determines a direction of the feature ray. If a normal fitting error is large, a propagation path of the feature ray will deviate from an expected direction. Therefore, both a coordinate error and a normal error during the fitting should be considered to obtain an accurate aspheric surface. The coordinate error and the normal error are linearly weighted, and an error evaluation function J is proposed:

$$J = \sum(Z-z)^2 + \omega \times \sum(U-u)^2 + \omega \times \sum(V-v)^2 \quad (3)$$
$$= (z-A_1P)^T(z-A_1P) + \omega(u-A_2P)^T(v-A_2P) +$$
$$\omega(v-A_3P)^T(v-A_3P).$$

Wherein Z is a fitting coordinate, (U, V, −1) is the fitting normal vector, z is a real coordinate, (u, v, −1) is a real normal vector, co is a weight of the normal error, P is an coefficient matrix (A, B, C, D . . . ) of unknown aspheric surface, $A_1$ is a matrix ($r^2$, $r^4$, $r^6$, $r^8$), $A_2$ is a matrix obtained by calculating the partial derivatives of $A_1$ with respect to x, and $A_3$ is a matrix obtained by calculating the partial derivatives of $A_1$ with respect to y.

When the error evaluation function J is smallest, a solving equation of the coefficient matrix P is:

$$P=(A_1^TA_1+\omega A_2^TA_2+\omega A_3^TA_3)^{-1}(A_1^Tz+\omega A_2^Tu+\omega A_3^Tv) \quad (4).$$

A method for fitting the feature data points $(P_1, P_2 \ldots P_k)$ to obtain the off-axis aspheric surface $A_K$ comprising the sub-step:

step (S31), transferring the coordinates $(x_0, y_0, z_0)$ of the feature data points $P_i$ (i=1, 2 . . . K) and their corresponding normal vectors $(\alpha_0, \beta_0, \gamma_0)$ in the global coordinate system $x_0y_0z_0$ to the coordinates (x, y, z) and their corresponding normal vectors $(\alpha, \beta, \gamma)$ in the local coordinate system xyz; and step (S32), performing the least squares fitting in the local coordinate system xyz.

In step (S31), a relationship between the coordinates $(x_0, y_0, z_0)$ in the global coordinate system $x_0y_0z_0$ and the coordinates (x, y, z) in the local coordinate system xyz can be written as:

$$\begin{cases} x = x_0 \\ y = (y_0 - a)\cos\theta - (z_0 - b)\sin\theta \\ z = (y_0 - a)\sin\theta + (z_0 - b)\cos\theta \end{cases}.$$

A relationship between the normal vectors ($\alpha_0$, $\beta_0$, $\gamma_0$) in the global coordinate system and normal vectors ($\alpha$, $\beta$, $\gamma$) in the local coordinate system xyz can be written as:

$$\begin{cases} u = u_0 \\ v = v_0\cos\theta - w_0\sin\theta \\ w = v_0\sin\theta + w_0\cos\theta \end{cases}.$$

In one embodiment, a number of local coordinate system positions are obtained by using a local search algorithm near the feature data points, from which a local coordinate system with the smallest fitting error is chosen, and a z-axis of the local coordinate system with the smallest fitting error is as an aspherical symmetry axis.

Figure 6:
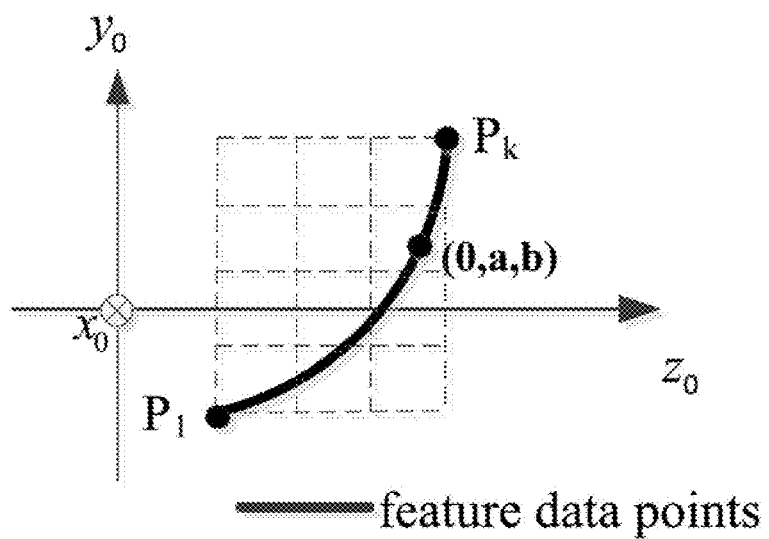
FIG. 6 is a schematic view of one embodiment of determining the parameters of the local coordinate system.

Referring to FIG. 6, a value of the aspheric vertex coordinates (0, a, b) is obtained by using a local search algorithm in a rectangle with a diagonal of the connection between the feature data points $P_1$ and $P_k$. In one embodiment, a grid mesh is generated in the rectangle with the diagonal of the connection between the feature data points $P_1$ and $P_k$, a grid node is a value of the vertex coordinates (0, a, b) of the aspheric surface $A_K$, and a grid size is a step size of (0, a, b). In one embodiment, the step size of (0, a, b) is about 0.2 mm. A value of the rotation angle $\theta$ can be ranged from about $-\pi$ to about $\pi$ for each set of (a, b). Therefore, a plurality of parameters (a, b, $\theta$) correspond to a plurality of local coordinate system positions can be obtained.

For each of the plurality of parameters (a, b, $\theta$), the coefficient matrix P (A, B, C, D . . . ) can be obtained by Eq. (4), and its corresponding J is known by Eq. (3). Selecting a parameter (a, b, $\theta$) whose corresponding J is the smallest and defining it as an optimal local coordinate position parameter, and the local coordinate system xyz is established using the optimal local coordinate position parameter. The coefficient matrix P (A, B, C, D . . . ) is substituted into Eq. (2) to obtain an optimal fitting aspheric surface.

In step (S4), the methods for solving the feature data points ($P'_1$, $P'_2$, . . . $P'_m$) on the aspheric surface "b" are the same as the methods for solving the feature data points ($P_1$, $P_2$, . . . $P_m$) on the aspheric surface "a". An equation of the aspheric surface "b" is the same as the equation of the aspheric surface "a". A method for fitting the feature data points ($P_1$, $P_2$, . . . $P_{m+1}$) to obtain the off-axis aspheric surface $A_{m+1}$, a method for fitting the feature data points ($P_1$, $P_2$, . . . $P_{m+2}$) to obtain the off-axis aspheric surface $A_{m+2}$, a method for fitting the feature data points ($P'_1$, $P'_2$, . . . $P'_m$) to obtain the off-axis aspheric surface $A'_m$ a method for fitting the feature data points ($P'_1$, $P'_2$, . . . $P'_{m+1}$) to obtain the off-axis aspheric surface $A'_{m+1}$, a method for fitting the feature data points ($P'_1$, $P'_2$, . . . $P'_{m+2}$) to obtain the off-axis aspheric surface $A'_{m+2}$ and a method for fitting the feature data points ($P'_1$, $P'_2$, . . . $P'_K$) to obtain the off-axis aspheric surface $A'_K$ are all the same as the method for fitting the feature data points ($P_1$, $P_2$, . . . $P_K$) to obtain the off-axis aspheric surface $A_K$.

Furthermore, a step of optimizing the off-axis aspheric optical system obtained in step (S6) can be performed, and the off-axis aspheric optical system obtained in step (S6) can be as the initial system.

An order of steps (S2) to (S5) can be changed according to the actual needs.

Figure 7:
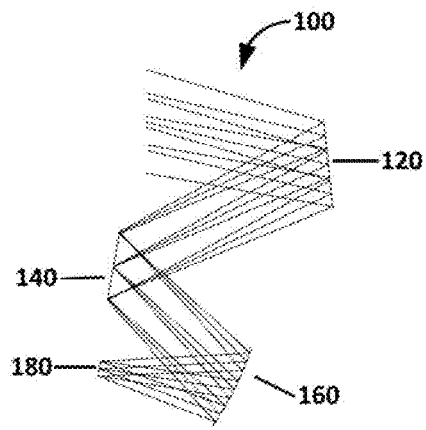
FIG. 7 is a schematic view of one embodiment of a configuration of an off-axis aspheric three-mirror optical system.

Referring to FIG. 7, an off-axis aspheric three-mirror optical system 100 is designed with the above method to prove the above method. The off-axis aspheric three-mirror optical system 100 comprises a primary mirror 120, a secondary mirror 140 and a tertiary mirror 160 located in that order and spaced from each other. The secondary mirror 140 is used as a stop surface. A surface shape of the primary mirror 120, a surface shape of the secondary mirror 140 and a surface shape of the tertiary mirror 160 are all aspheric surfaces. The feature rays exiting from the light source would be successively reflected by the primary mirror 120, the secondary mirror 140 and the tertiary mirror 160 to form an image on an image sensor 180. The parameters of the off-axial three-mirror optical system 100 are shown in table 1 below.

TABLE 1 parameters of the off-axial three-mirror optical system 100

| Parameters | Values |
| --- | --- |
| Field of View | 2° × 6° (an angle in a meridian direction is in a range from −16° to −10°) |
| F-number | 2 |
| entrance pupil diameter | 100 mm |
| Wave Range | Visible light (400-700 nm) |

In one embodiment, six off-axial fields are selected during a designing process of the off-axis aspheric three-mirror optical system 100. The six off-axial fields are (0°, −16°), (0°, −13°), (0°, −10°), (1°, −16°), (1°, −13°), and (1°, −10°). 112 feature rays are selected in each off-axial field, and 672 feature rays that corresponds different pupil positions and different off-axial fields are selected. The value of m is about 380, and the step size of (0, a, b) is about 0.2 mm.

Figure 8:
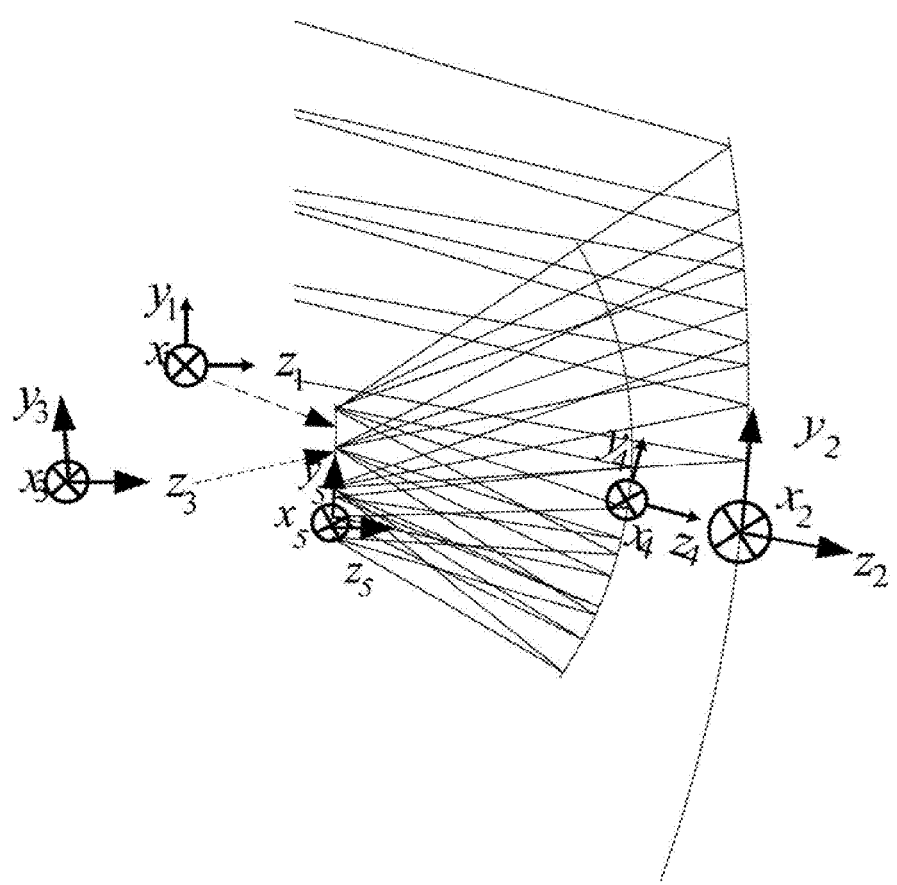
FIG. 8 is a position diagram of one embodiment of a primary mirror, a secondary mirror and a tertiary mirror of an off-axis aspheric three-mirror optical system.

Referring to FIG. 8, a first three-dimensional rectangular coordinates system ($x_1$, $y_1$, $z_1$) is defined in space. A $z_1$-axis is along an horizontal line, in the $z_1$-axis, to the left is negative, and to the right is positive. A $y_1$-axis is in a direction substantially perpendicular to the $z_1$-axis, in the $y_1$-axis, to the upward is positive, and to the downward is negative. An $x_1$-axis is perpendicular to a $y_1z_1$ plane, in the $x_1$-axis, in a direction substantially perpendicular to the $y_1z_1$ plane, to the inside is positive, and to the outside is negative.

In space relative to the first three-dimensional rectangular coordinates system ($x_1$, $y_1$, $z_1$), a second three-dimensional rectangular coordinates system ($x_2$, $y_2$, $z_2$) is defined by a primary mirror location, a third three-dimensional rectangular coordinates system ($x_3$, $y_3$, $z_3$) is defined by a secondary mirror location, a fourth three-dimensional rectangular coordinates system ($x_4$, $y_4$, $z_4$) is defined by a tertiary mirror location, and a fifth three-dimensional rectangular coordinates system ($x_5$, $y_5$, $z_5$) is defined by an image sensor location.

A second origin of the second three-dimensional rectangular coordinates system ($x_2$, $y_2$, $z_2$) is in (0, −37.6707, 212.9768) position of the first three-dimensional rectangular coordinates system ($x_1$, $y_1$, $z_1$), whose unit is millimeter. A $z_2$-axis positive direction rotates about 5.2210 degrees along a clockwise direction relative to a $z_1$-axis positive direction.

A third origin of the third three-dimensional rectangular coordinates system ($x_3$, $y_3$, $z_3$) is in (0, −2.9078, −0.9909) position of the first three-dimensional rectangular coordinates system ($x_1$, $y_1$, $z_1$), whose unit is millimeter. A $z_3$-axis positive direction rotates about 3.2412 degrees along a clockwise direction relative to a $z_1$-axis positive direction.

A fourth origin of the fourth three-dimensional rectangular coordinates system ($x_4$, $y_4$, $z_4$) is in (0, −11.5288, 154.8088) position of the first three-dimensional rectangular coordinates system ($x_1$, $y_1$, $z_1$), whose unit is millimeter. A $z_4$-axis positive direction rotates about 2.3759 degrees along a clockwise direction relative to a $z_1$-axis positive direction.

A fifth origin of the fifth three-dimensional rectangular coordinates system ($x_5$, $y_6$, $z_5$) is in (0, −39.4349, −1.9678) position of the first three-dimensional rectangular coordinates system ($x_1$, $y_1$, $z_1$), whose unit is millimeter. A $z_5$-axis positive direction rotates about 5.1301 degrees along a clockwise direction relative to a $z_1$-axis positive direction.

A length of the off-axis aspheric three-mirror optical system 100 along the $y_1$-axis is about 280 millimeters. A length of the off-axis aspheric three-mirror optical system 100 along the $z_1$-axis is about 220 millimeters In the second three-dimensional rectangular coordinates system ($x_2$, $y_2$, $z_2$); a reflective surface of the primary mirror 120 is a sixth-order polynomial aspheric of $x_2y_2$. In the third three-dimensional rectangular coordinates system ($x_3$, $y_3$, $z_3$); a reflective surface of the secondary mirror 140 is a sixth-order polynomial aspheric of $x_3y_3$. In the fourth three-dimensional rectangular coordinates system ($x_4$, $y_4$, $z_4$); a reflective surface of the a tertiary mirror 160 is a sixth-order polynomial aspheric of $x_4y_4$. The sixth-order polynomial aspheric of $x_2y_2$, sixth-order polynomial aspheric of $x_3y_3$, and the sixth-order polynomial aspheric of $x_4y_4$ can be expressed as follows:

$$Z = \frac{cr^2}{1+\sqrt{1-(1+k)c^2r^2}} + a_1 r^4 + a_2 r^6 \quad r^2 = x^2 + y^2. \quad (5)$$

The term $$\frac{cr^2}{1+\sqrt{1-(1+k)c^2r^2}}$$

is transformed into linear XY polynomials by a Taylor series expansion to simplify the fitting process. Thus, the equation (5) can be expressed as follows:

$$Z = Ar^2 + Br^4 + Cr^6 \quad (6).$$

The aspheric coefficients (A, B, C) and the positional parameters (a, b, θ) of the primary mirror 120, the secondary mirror 140 and the tertiary mirror 160 can be obtained by above method. The aspheric coefficients (A, B, C) can be transformed into the aspheric coefficients (c, $a_1$, $a_2$) by Eq (2) to use Eq. (5) as the aspheric expression in the subsequent optimization, in one embodiment, k=0, which can simplify the calculation. The aspheric coefficients (A, B, C) and the positional parameters (a, b, θ) of the primary mirror 120, the secondary mirror 140 and the tertiary mirror 160 are shown in table 2 below. However, the values of the aspheric coefficients (A, B, C) and the positional parameters (a, b, θ) of the primary mirror 120, the secondary mirror 140 and the tertiary mirror 160 are not limited to TABLE 2.

TABLE 2

| | A | B | C | c | $a_1$ | $a_2$ | a | b | θ/° |
|---|---|---|---|---|---|---|---|---|---|
| primary mirror | −1.54E−05 | 7.37E−11 | −1.26E−16 | −3.08E−05 | 7.37E−11 | −1.26E−16 | −5.5 | 350.2 | 5.7296 |
| secondary mirror | 5.63E−06 | −1.70E−09 | 1.46E−13 | 1.13E−05 | −1.70E−09 | 1.46E−13 | 0 | −100 | −10.0268 |
| tertiary mirror | −0.001 | 8.35E−11 | −2.68E−15 | −0.00201 | 1.10E−09 | −6.29E−16 | −381.8 | 39.4 | −45.8366. |

Figure 9:
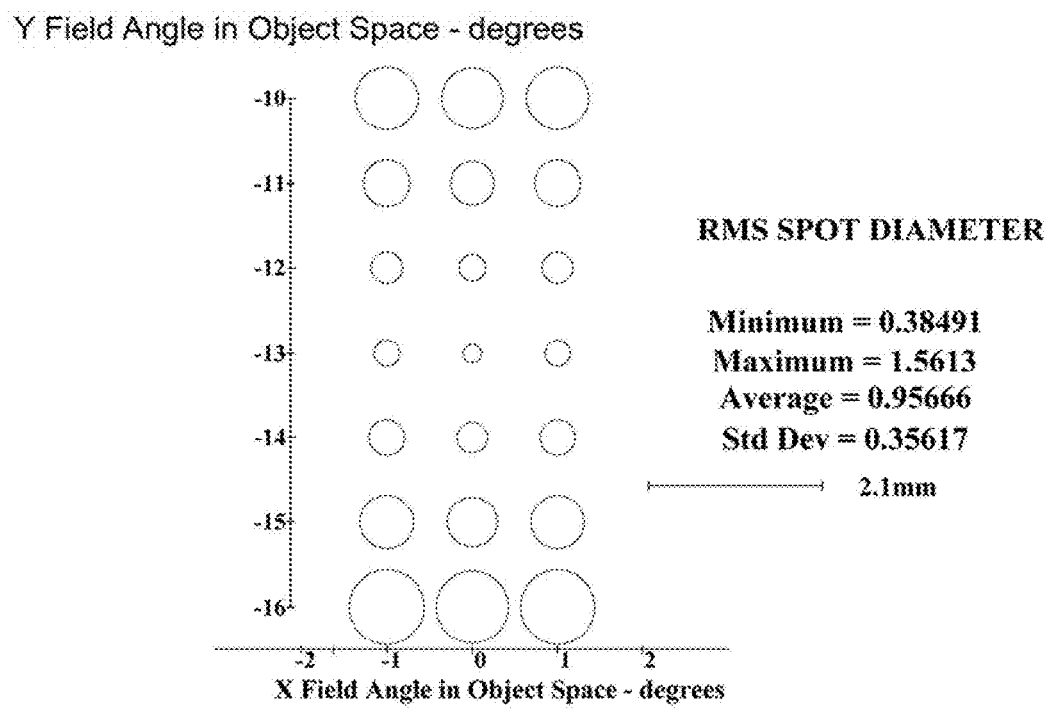
FIG. 9 shows average RMS spot diameters of one embodiment of an off-axis aspheric three-mirror optical system.

Referring to FIG. 9, the RMS spot diameters of the off-axis aspheric three-mirror optical system 100 is shown. It can be seen that an average value of the RMS spot diameters is about 0.96 mm. It shows that the RMS spot diameters of the off-axis aspheric three-mirror optical system 100 is small, therefore the off-axis aspheric three-mirror optical system 100 can be used as a good initial structure for subsequent optimization.

Figure 10:
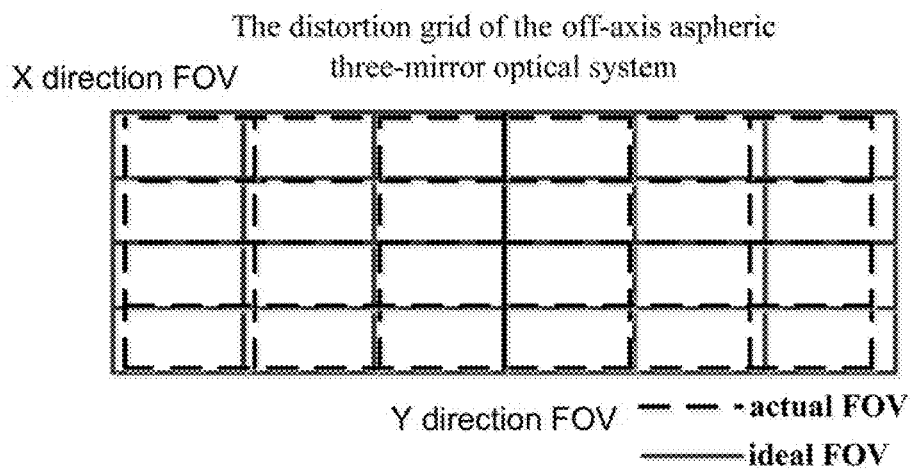
FIG. 10 shows a distortion grid view of one embodiment of an off-axis aspheric three-mirror optical system.

Referring to FIG. 10, it can be seen that a maximum relative distortion is 6.11%. Therefore the off-axis aspheric three-mirror optical system 100 can be used as a good initial structure for subsequent optimization.

Figure 11:
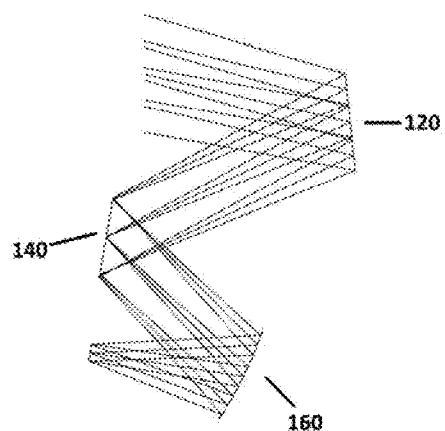
FIG. 11 shows a light path schematic view of one embodiment of an off-axis aspheric three-mirror optical system.

Referring to FIG. 11, a light path schematic view of the off-axis aspheric three-mirror optical system 100 is shown. It is shown that the plurality of feature rays Ri (i=1, 2 . . . K) from different fields and different aperture positions substantially focus around the ideal target point.

The off-axis aspheric three-mirror optical system 100 can be optimized to improve the imaging quality and reduce the relative distortion. The off-axis aspheric three-mirror optical system 100 is used as the initial structure for subsequent optimization. The values of the aspheric coefficients (A, B, C) of the primary mirror 120, the secondary mirror 140 and the tertiary mirror 160 after optimization are shown in table 3 below. However, the values of the aspheric coefficients (A, B, C) of the primary mirror 120, the secondary mirror 140 and the tertiary mirror 160 after optimization are not limited to TABLE 3.

TABLE 3

| aspheric coefficients | primary mirror | secondary mirror | tertiary mirror |
|---|---|---|---|
| R/mm | −760.3377 | −180.6545 | −215.2937 |
| c/mm$^{-1}$ | −0.001315 | −0.005535 | −0.004645 |
| k | 0 | 0 | 0.24 |
| a | 3.5869e−010 | −4.3511e−008 | 5.0028e−010 |
| $a_2$ | 9.9633e−017 | −4.2831e−012 | 7.6324e−015 |
| θ/° | −5.2210 | −3.2412 | −2.3759 |
| a | −37.6707 | −2.9078 | −11.5288 |
| b | 212.9768 | −0.9909 | 154.8808 |

Figure 12:
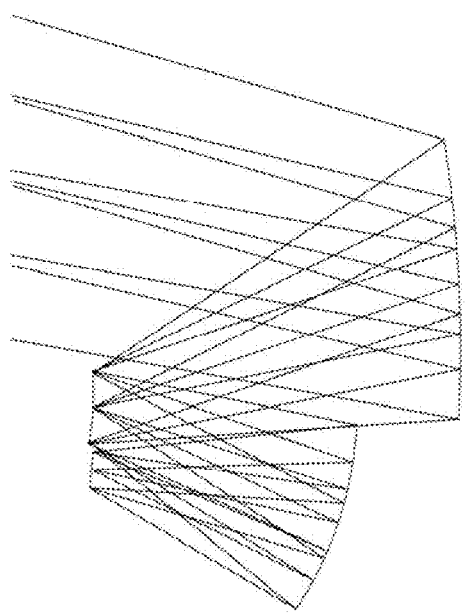
FIG. 12 shows a light path schematic view of one embodiment of an off-axis aspheric three-mirror optical system after optimization.

Referring to FIG. 12, a light path schematic view of the off-axis aspheric three-mirror optical system 100 after optimization is shown. It is shown that the plurality of feature rays $R_i$ (i=1, 2 . . . K) from different fields and different aperture positions substantially focus on the ideal target point, the image quality is improved.

Figure 13:
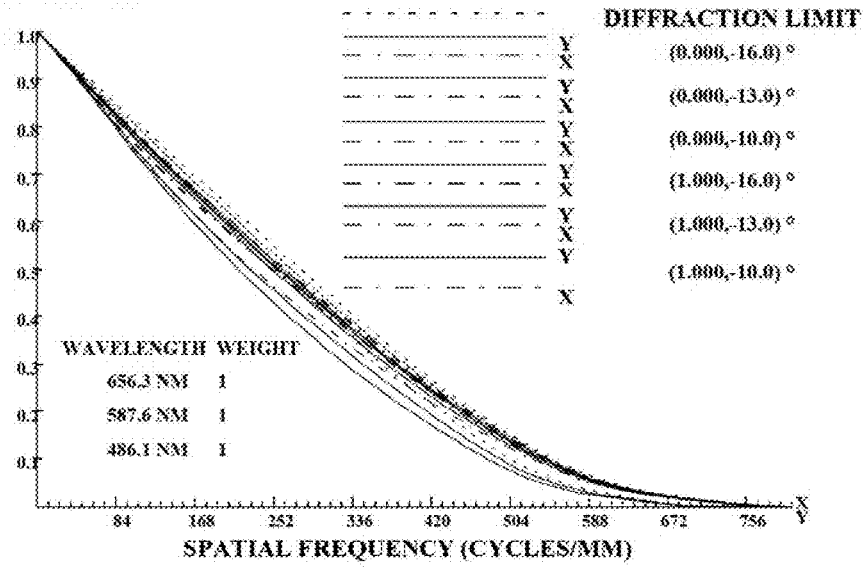
FIG. 13 shows a modulation transfer function (MTF) curve of one embodiment of an off-axis aspheric three-mirror optical system after optimization.

FIG. 13 illustrates that a modulation transfer functions (MTF) in visible light band of partial field angles of the off-axis aspheric three-mirror optical system 100 after optimization are closes to the diffraction limitation, and the image quality is further improved.

Figure 14:
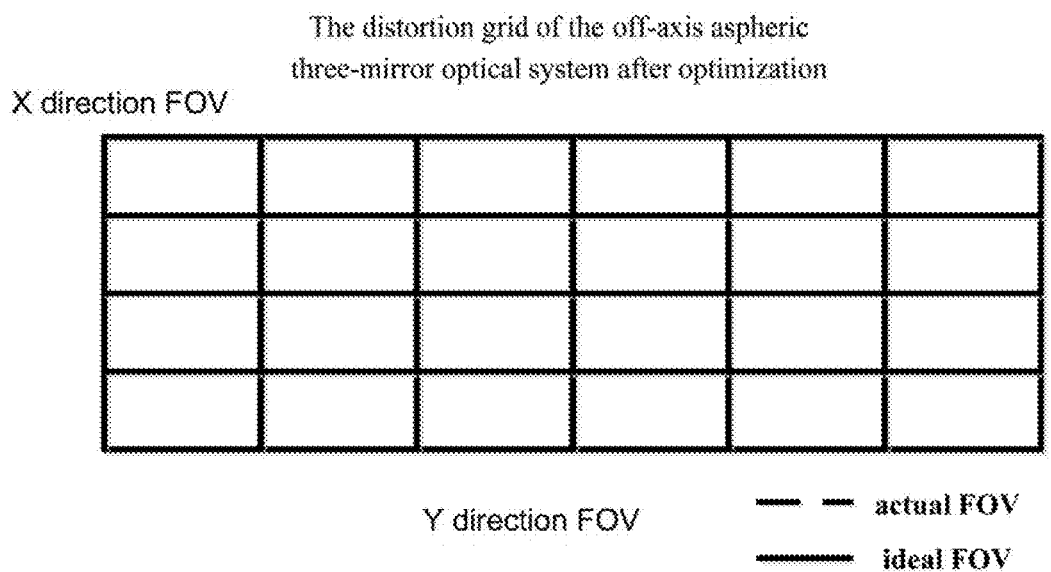
FIG. 14 shows a distortion grid view of one embodiment of an off-axis aspheric three-mirror optical system after optimization.

Referring to FIG. 14, it can be seen that a maximum relative distortion of the off-axis aspheric three-mirror optical system 100 after optimization is 0.3%. It shows that an imaging error is small and the image quality is high.

Figure 15:
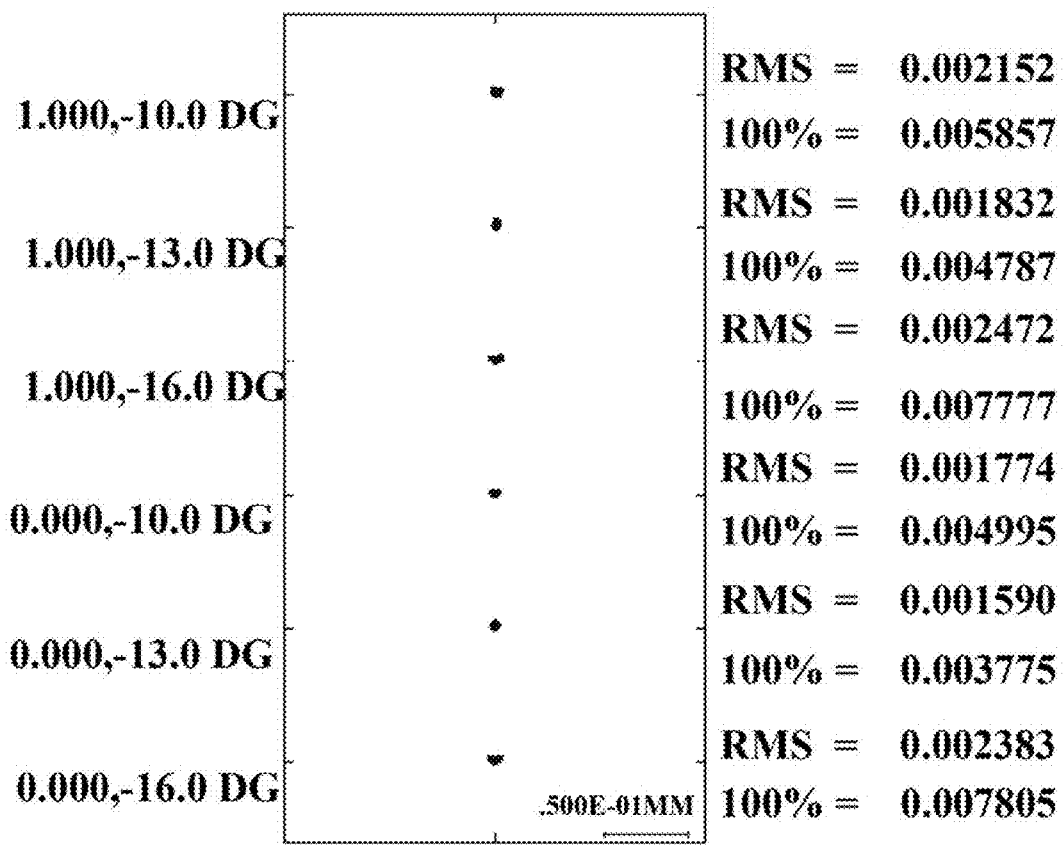
FIG. 15 shows a spot diagram of one embodiment of an off-axis aspheric three-mirror optical system after optimization.

Referring to FIG. 15, it can be seen that the root mean square (RMS) of the pixel spot of the off-axis aspheric three-mirror optical system 100 after optimization are less than 3 μm, which meets the design requirements.

Figure 16:
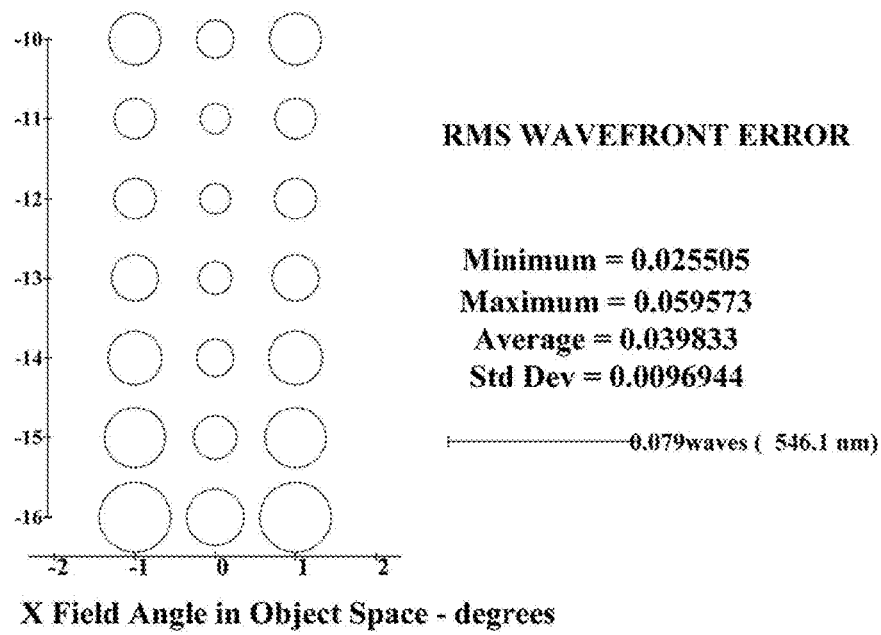
FIG. 16 shows a RMS wavefront error diagram of one embodiment of the off-axis aspheric three-mirror optical system 100 after optimization.

Referring to FIG. 16, the RMS wavefront error of the off-axis aspheric three-mirror optical system 100 after optimization is shown. It can be seen that the average value of the RMS wavefront error is about λ/10, wherein λ=587.6 nm. It shows that the imaging quality of the off-axis three-mirror optical system with freeform surfaces 100 is high.

An effective entrance pupil diameter of the off-axis aspheric three-mirror optical system 100 is about 100 millimeter.

The off-axis aspheric three-mirror optical system 100 adopts an off-axis field of view in a vertical direction. A field angle of the off-axis aspheric three-mirror optical system 100 is about 2°×6°, wherein an angle in an horizontal direction is in a range from about −1° to about 1°, and an angle in the vertical direction is in a range from about −16° to about −10°.

A wavelength of the off-axis aspheric three-mirror optical system 100 is not limited, in one embodiment, the wavelength is in a range from about 4 microns to about 7 microns.

An effective focal length (EFL) of the off-axis aspheric three-mirror optical system 100 is about 200 millimeters.

F-number of the off-axis aspheric three-mirror optical system 100 is a D/f reciprocal, the F-number can up to a range from about 1.95 to about 2.05. In one embodiment, the relative aperture (D/f) of the off-axis aspheric three-mirror optical system 100 is about 0.5, and the F-number is about 2.0.

Since the off-axis aspheric three-mirror optical system has no center block, the aspheric three-mirror optical system can achieve a larger field of view, and obtain the images close to an ideal imaging effect. The applications of the off-axis aspheric three-mirror optical system 100 comprises earth observation, space target detection, astronomical observations, Multi-spectral thermal imaging, and dimensional mapping. The off-axis aspheric three-mirror optical system can be used in the visible band or the infrared band.

The method for designing off-axis aspheric three-mirror optical system can have many advantages. First, the plurality of feature rays $R_i$ (i=1, 2 . . . K) from different fields and different aperture positions are considered, which overcome the limitations of the conventional methods in the number of fields and the number of apertures. Second, the plurality of feature data points were calculated first and fitted into an initial aspheric surface. Then, intermediate point calculations, feature data point calculations, and aspheric surface fitting were repeated continuously to calculate remaining feature data points and the desired aspheric surface, which improve the accuracy of the method. Third, the method considers both the coordinates and the normal vectors of the plurality of feature data points; therefore, the aspheric shape of the off-axis aspheric three-mirror optical system designed by the method is accurate.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. An off-axis aspheric three-mirror optical system comprising:
a primary mirror located on an outgoing light path of rays;
a secondary mirror located on a first reflected light path, which is from the primary mirror;
a tertiary mirror located on a second reflected light path, which is from the secondary mirror; and
an image sensor located on a third reflected light path, which is from the tertiary mirror;
wherein a first three-dimensional rectangular coordinates system $(x_1, y_1, z_1)$ is defined in space, relative to the first three-dimensional rectangular coordinates system $(x_1, y_1, z_1)$, a second three-dimensional rectangular coordinates system $(x_2, y_2, z_2)$ is defined by a primary mirror location, a third three-dimensional rectangular coordinates system $(x_3, y_3, z_3)$ is defined by a secondary mirror location, and a fourth three-dimensional rectangular coordinates system $(x_4, y_4, z_4)$ is defined by a tertiary mirror location; in the second three-dimensional rectangular coordinates system $(x_2, y_2, z_2)$ a reflective surface of the primary mirror is a sixth-order polynomial aspheric of $x_2y_2$, and the sixth-order polynomial aspheric of $x_2y_2$ is:

$$Z = \frac{cr^2}{1+\sqrt{1-(1+k)c^2r^2}} + a_1r^4 + a_2r^6 \quad r^2 = x_2^2 + y_2^2,$$

wherein, c represents surface curvature at quadratic surface vertex, k represents conic constant, $a_1$ and $a_2$ represent an aspherical term coefficient c=−0.001315 mm$^{-1}$, k=0, $a_1$=3.5869e-010, and $a_2$=9.9633e-017; in the third three-dimensional rectangular coordinates system $(x_3, y_3, z_3)$, a reflective surface of the secondary mirror is a sixth-order polynomial aspheric of $x_3y_3$; and in the fourth three-dimensional rectangular coordinates system $(x_4, y_4, z_4)$, a reflective surface of the a tertiary mirror is a sixth-order polynomial aspheric of $x_4y_4$.

2. The system as claimed in claim 1, wherein a second origin of the second three-dimensional rectangular coordinates system $(x_2, y_2, z_2)$ is in (0, −37.6707, 212.9768) position of the first three-dimensional rectangular coordinates system $(x_1, y_1, z_1)$.

3. The system as claimed in claim 1, wherein a $z_2$-axis positive direction rotates about 5.2210 degrees along a clockwise direction relative to a $z_1$-axis positive direction.

4. The system as claimed in claim 1, wherein a third origin of the third three-dimensional rectangular coordinates system $(x_3, y_3, z_3)$ is in (0, −2.9078, −0.9909) position of the first three-dimensional rectangular coordinates system $(x_1, y_1, z_1)$.

5. The system as claimed in claim 1, wherein a $z_3$-axis positive direction rotates about 3.2412 degrees along a clockwise direction relative to a $z_1$-axis positive direction.

6. The system as claimed in claim 1, wherein a fourth origin of the fourth three-dimensional rectangular coordinates system $(x_4, y_4, z_4)$ is in (0, −11.5288, 154.8088) position of the first three-dimensional rectangular coordinates system $(x_1, y_1, z_1)$.

7. The system as claimed in claim 1, wherein a $z_4$-axis positive direction rotates about 2.3759 degrees along a clockwise direction relative to a $z_1$-axis positive direction.

8. The system as claimed in claim 1, wherein the sixth-order polynomial aspheric of $x_3y_3$ is:

$$Z = \frac{cr^2}{1+\sqrt{1-(1+k)c^2r^2}} + a_1r^4 + a_2r^6 \quad r^2 = x_3^2 + y_3^2,$$

wherein c represents surface curvature at quadratic surface vertex, k represents conic constant, $a_1$ and $a_2$ represent an aspherical term coefficient; c=−0.005535 mm$^{-1}$, k=0, $a_1$=−4.3511e-008, and $a_2$=−4.2831e-012.

9. The system as claimed in claim 1, wherein the sixth-order polynomial aspheric of $x_4y_4$ is:

$$Z = \frac{cr^2}{1+\sqrt{1-(1+k)c^2r^2}} + a_1r^4 + a_2r^6 \quad r^2 = x_4^2 + y_4^2,$$

wherein c represents surface curvature at quadratic surface vertex, k represents conic constant, $a_1$ and $a_2$ represent an aspherical term coefficient; c=−0.004645 mm$^{-1}$, k=0, $a_1$=5.0028e-010, and $a_2$=7.6324e-015.

10. The system as claimed in claim 1, wherein a length of the off-axis aspheric three-mirror optical system along a $y_1$-axis is about 280 millimeters, and a length of the off-axis aspheric three-mirror optical system along a $z_1$-axis is about 220 millimeters.

11. The system as claimed in claim 1, wherein an effective entrance pupil diameter of the off-axis aspheric three-mirror optical system is about 100 millimeter.

12. The system as claimed in claim 1, wherein a field angle of the off-axis aspheric three-mirror optical system is about 2°×6°.

13. The system as claimed in claim 12, wherein an angle in an horizontal direction is in a range from about −1° to about 1°.

14. The system as claimed in claim 12, wherein an angle in a vertical direction is in a range from about −16° to about −10°.

15. The system as claimed in claim 1, wherein an effective focal length of the off-axis aspheric three-mirror optical system is about 200 millimeters.

16. The system as claimed in claim 1, wherein an F-number is in a range from 1.95 to 2.05.

17. The system as claimed in claim 16, wherein the F-number is 2.0.

* * * * *